United States Patent [19]

Baker et al.

[11] Patent Number: 5,012,777
[45] Date of Patent: May 7, 1991

[54] INTERNAL COMBUSTION ENGINE

[76] Inventors: Quentin A. Baker, P.O. Box 6477, San Antonio, Tex. 78209; Henry E. Mecredy, 1630-C W. 6th, Austin, Tex. 78703; Glenn B. O'Neal, 6503 Wagner Way, San Antonio, Tex. 78256

[21] Appl. No.: 464,105
[22] Filed: Jan. 12, 1990
[51] Int. Cl.⁵ ............................................. F02F 1/00
[52] U.S. Cl. ................................................. 123/254
[58] Field of Search ............... 123/250, 276, 260, 261, 123/269, 270, 271, 272

[56] References Cited

U.S. PATENT DOCUMENTS

| | | | |
|---|---|---|---|
| 3,257,994 | 6/1966 | Clements et al. | 123/254 |
| 3,398,726 | 8/1968 | Bricout | 123/254 |
| 3,895,613 | 7/1975 | Joshi | 123/254 |
| 4,240,392 | 12/1980 | Matayoshi et al. | 123/254 |
| 4,321,898 | 3/1982 | Latsch | 123/254 |
| 4,768,481 | 9/1988 | Wood | 123/254 |

Primary Examiner—Raymond A. Nelli
Attorney, Agent, or Firm—Baker & Botts

[57] ABSTRACT

An improved engine is provided that more efficiently consumes difficult fuels such as coal slurries or powdered coal. The engine includes a precombustion chamber having a portion thereof formed by an ignition plug. The precombustion chamber is arranged so that when the piston is proximate the head, the precombustion chamber is sealed from the main cylinder or the main combustion chamber and when the piston is remote from the head, the precombustion chamber and main combustion chamber are in communication. The time for burning of fuel in the precombustion chamber can be regulated by the distance required to move the piston from the top dead center position to the position wherein the precombustion chamber and main combustion chamber are in communication.

11 Claims, 1 Drawing Sheet

INTERNAL COMBUSTION ENGINE

This invention was made with Government support under Contract No. DE-AC21-85MC 22123, Department of Energy. The Government has certain rights in this invention.

TECHNICAL FIELD OF THE INVENTION

This invention related generally to improved internal combustion engines of the diesel type. More particularly, but not by way of limitation, this invention relates to an internal combustion engine for burning difficult fuels in compression ignition engines that include a precombustion chamber for initiating combustion of fuel.

BACKGROUND OF THE INVENTION

Fuels, such as liquid base coal slurries are difficult to ignite. The procedure usually followed is to inject a small quantity of pilot fuel, such as fuel oil, into the combustion chamber prior to injection of the coal slurry. The fuel oil is then ignited to promote ignition of the coal slurry.

The slurries are liquid based and must be injected at an early time during compression stroke to allow time for the liquid to evaporate. The evaporation of the liquid cools the air charge which increases the difficulty of igniting the pilot fuel. Accordingly, it is necessary to provide additional energy in the form of heat, either to the air or to the combustion chamber surfaces, to provide adequate heat to evaporate the liquid and to ignite the fuel charge.

Another problem encountered in attempting to burn difficult fuels, such as coal powder, has been that the powder may auto-ignite causing serious problems with engine timing. The timing problems may result in poor engine performance as well as possible damage to mechanical parts of the engine. With any of the coal fuels, severe ring and liner wear may occur when incomplete combustion is present and residual abrasive particles remain in the cylinder.

With the difficult fuels, a greater amount of heat is necessary in order to assure complete combustion. Due to the greater heat provided, the hot surfaces are necessarily heavily insulated and require special materials to prevent material failures in the hot areas, such as around the piston rings and the cylinder walls or liners.

In an effort to overcome such problems, design activity in the engine combustion area for promoting the burning of the difficult fuels has included the development of precombustion chambers wherein initial combustion occurs thus limiting the maximum heat to a confined area. Materials used in constructing such hot areas can be effectively utilized to avoid the above-mentioned problems.

U.S. Pat. No. 1,648,647 issued Nov. 8, 1927 to E. Kretigen illustrates the use of a precombustion chamber in an internal combustion engine of the diesel type. U.S. Pat. No. 1,696,799 issued Dec. 25, 1928 to G. Held illustrates the use of a specially designed combustion chamber to aid in the burning of heavy oils in engines of the diesel type.

SUMMARY OF THE INVENTION

This invention provides, in an internal combustion engine, a precombustion chamber that is defined by the engine piston and ignition plug member with a precombustion chamber being connected to the fuel supply whereby fuel is initially injected into the precombustion chamber. The precombustion chamber is isolated from the main combustion chamber in the cylinder bore when the piston is adjacent to the engine head and is in communication with the main combustion chamber when the piston is located remote from the head. Accordingly, an engine constructed in accordance with the invention provides for the efficient burning of difficult fuels since the initial ignition is started in the precombustion chamber which is out of communication with the main cylinder and such ignition ignites the main fuel charge in the cylinder when the piston moves downwardly permitting communication between the precombustion chamber and the cylinder.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
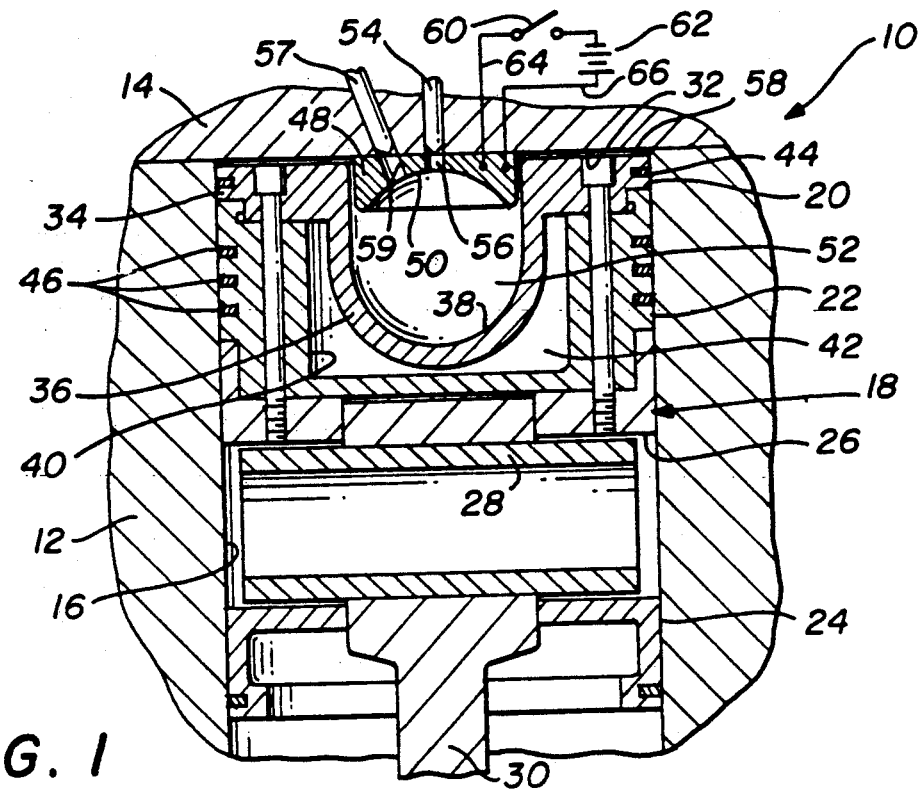
FIG. 1 is a fragmentary cross-sectional view, partly schematic, showing the precombustion chamber, piston and cylinder arrangement that is constructed in accordance with the invention.

Referring to the drawing in FIG. 1 in particular, shown therein and generally designated by the reference character 10 is a portion of an engine that is constructed in accordance with the invention. The engine includes a cylinder block 12 which may or may not include a cylinder liner (not shown) and a head 14 closing one end of a bore 16 that extends through the cylinder block.

Disposed for reciprocating movement in the bore 16 is a piston that is generally designated by the reference character 18. Piston 18 includes a top or upper portion 20, a ring portion 22 and a skirt portion 24. It should be noted that the skirt portion 24 has a bore 26 extending therethrough for receiving a wrist pin 28. Although not illustrated, the wrist pin 28 is retained in the bore 26. The wrist pin pivotally supports one end of a connecting rod 30 which extends downwardly into connection with an engine crank shaft (not shown).

The top portion 20, ring portion 22, and skirt portion 24 are retained in assembled relationship by a plurality of threaded fasteners 32 that extend therethrough. Manifestly, the piston 18 may be constructed with less components depending on the manufacturing procedure utilized. The upper portion 20 of the piston 18 includes a flange 34 that extends around the outer periphery thereof with a hemispherical portion 36 connected to the inner portion of the flange 34. The hemispherical portion extends downwardly and relatively away from the head 14 forming a generally hemispherical surface 38 that faces the head 14. The ring portion 22 includes a bore 40 which cooperates with the hemispherical portion 36 of the top portion 20 to form a cavity 42. The cavity 42 aids in preventing overheating of the hemispherical portion 38.

Annular ring grooves 44 encircle the piston 18 and are arranged to receive a plurality of rings 46. The ring 46 maintains appropriate seals with the cylinder block 12.

Although not illustrated, it will be understood that the head 14 and/or cylinder block 12 will be provided with appropriate ports and valves for the intake of scavenging air and for the exhaust of spent gasses.

Mounted on the head 14 is a generally cylindrical ignition plug 48 which has a recess formed in the surface thereof facing the piston 18. The recess forms a partially spherical surface 50 which, in combination with the surface 38 in the upper portion of the piston provides a generally spherical precombustion chamber 52.

Fuel in injected into the precombustion chamber 52 through a fuel injector 54 and through the port 56 that extends through the ignition plug 48. A second fuel injector 57 extends through the head 14 into communication with a port 59 which is utilized for injecting fuel into the cylinder bore 16.

As will be evident from viewing FIG. 1, a main combustion chamber 58 is defined by the head 14, the cylinder bore 16 and the top of the piston assembly 18. In the engine illustrated, combustion occurs as a result of the heat generated upon compression of the fuel by the piston 16 as it moves toward the head 14.

In some applications it may be necessary to initiate ignition by heating the ignition plug 48. For this purpose, a schematic circuit is illustrated that includes a switch 60 and a source of electrical energy 62. Conductors 64 and 66 are connected to the ignition plug 48 in such a manner as to cause heating of the plug 48 when the switch 60 is in the closed position.

OPERATION OF THE PREFERRED EMBODIMENT

As shown in FIG. 1, the piston 18 is approximately at top dead center. As the piston 18 moves toward the top dead center position, an easily ignited pilot fuel is injected through the injector 54 and the port 56 into the precombustion chamber 52. Further upward movement of the piston 18 compresses the gas in the precombustion chamber 52 and, through the heating of the fuel by compression and by the ignition plug 48 pilot fuel in the precombustion chamber 52 is ignited. Generally, such ignition occurs slightly ahead of top dead center. In this case, precombustion can occur early without detrimental effects on the wrist pin, connecting rod and crank shaft since a relatively small area of the piston 18 is involved.

The precombustion chamber 52 is essentially sealed from the main cylinder 58 due to the telescoping arrangement between the exterior of the ignition plug 48 and the piston top 20. As the piston 18 begins to travel downwardly, the top portion 20 passes the bottom of the ignition plug 48 providing communication directly from the precombustion chamber 52 into the main combustion chamber or cylinder 58.

The main fuel charge is injected into the cylinder though the fuel injector 57 and port 59 so that the ignition of the main fuel begins due to the burning pilot fuel. As the piston moves downwardly, continued burning of the main and pilot fuel occurs providing maximum downward force on the piston assembly 18 as the gasses resulting from the fuel burn expand in the cylinder 58.

It will, of course, be understood that the length of the ignition plug 48, that is, the distance which the plug 48 extends into the piston 18 will determine the length of time that the precombustion chamber 52 is sealed. Ignition plugs 48 having different depths could be utilized to accommodate different fuels to be burned, promoting the optimum efficiency of burning of the pilot fuel and the ignition of the main fuel prior to and as communication of the precombustion chamber 52 with the main cylinder 58 occurs.

It will be understood that an engine having the precombustion system described provides for the optimum burning of the difficult fuels. At the same time, maximum engine efficiency is promoted due to the arrangement and construction of the sealed precombustion chamber in combination with the main cylinder arrangement.

DETAILED DESCRIPTION

Figure 2:
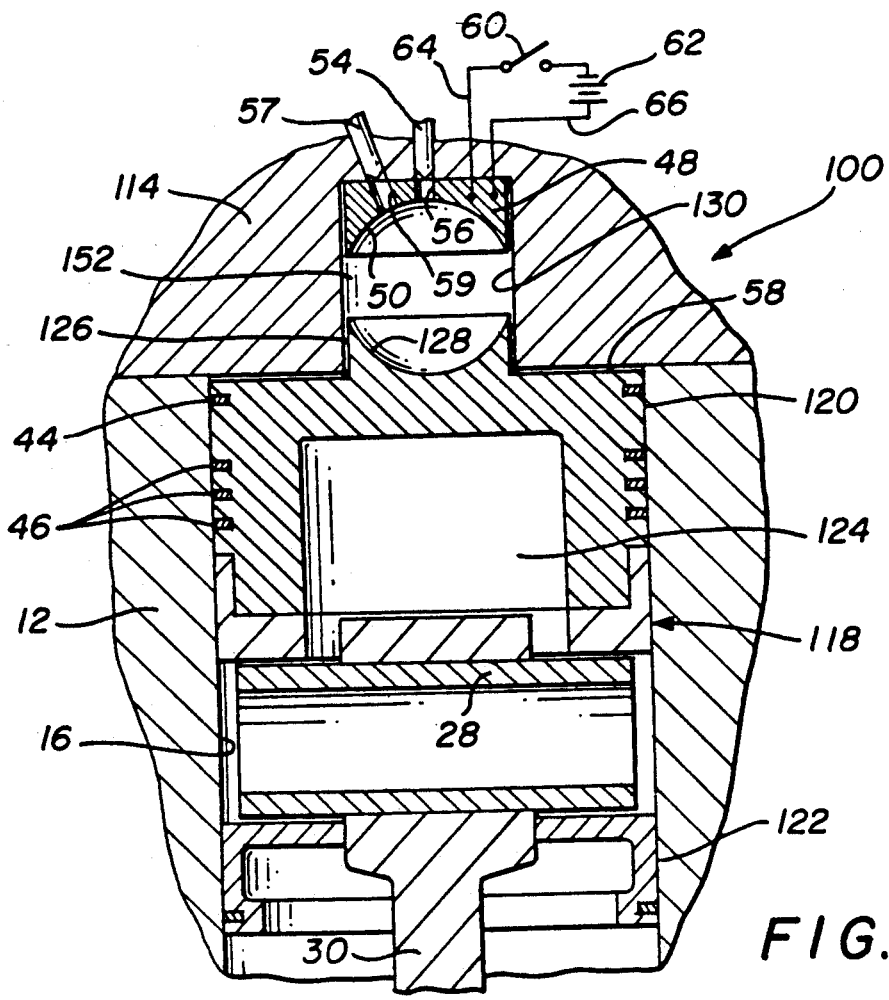
FIG. 2 is a view similar to FIG. 1, but illustrating another embodiment of the precombustion chamber, piston and cylinder that is also constructed in accordance with the invention.

As will be appreciated from viewing FIGS. 1 and 2, the embodiment of FIG. 2 is in many respects the same as described in connection with FIG. 1. In those instances, the same reference characters will be used in describing the embodiment shown in FIG. 2 as were used in connection with the description of FIG. 1.

As shown in FIG. 2, there is provided an engine 100 that is also constructed in accordance with the invention. The engine 100 includes the cylinder block 12 previously described, a head 114 that is arranged to close one end of the cylinder bore 16, and a piston 118 that is disposed within the bore 16 for reciprocating movement toward and away from the head 114.

The piston assembly 118 includes an upper portion 120 connected to a skirt portion 122. The wrist pin 28 extends through the skirt portion 122 connecting the piston 118 to the connecting rod 30.

The upper portion 120 of the piston 118 is provided on its exterior with a plurality of piston ring grooves 44 in which piston rings 46 are located. The piston 118 is hollow as indicated at 124 to promote cooling of the piston.

On its upper end, the piston 118 is provided with a protuberance 126 which has a partially spherical surface 128 formed by a recess therein. It will be noted that the protuberance 126 projects upwardly into a bore 130 in the head 114. Ignition plug 48, previously described, is also located in the bore 130. The plug 48 is provided with the partially spherical surface 50 which is oriented to face toward the surface 128 on the piston 118. Surfaces 50 and 128 cooperate to form a generally spherical precombustion chamber 152 that is physically located within the head 114.

For the purpose of injecting fuel into the engine 100, injectors 54 and 57 are provided as in engine 10. The injector 54, for pilot fuel, is aligned with the port 56 which extends through the ignition plug 48. Injector 57 is aligned with port 59 for injecting main fuel into the engine.

For the purpose of heating the plug 48 during the starting cycle of the engine 100, the power supply 62 is connected to the ignition plug 48 by conductors 64 and 66. The switch 60 is located in the conductor 64 so that the plug 48 can be switched on for heating during ignition and switched off when the external heat source is no longer needed.

OPERATION OF THE EMBODIMENT OF FIG. 2

The operation of the engine 100 is essentially the same as that of the engine 10 which was previously described. It will, of course, be understood that the precombustion chamber 152 is located in the head instead of in the piston as was true in the engine 10.

To start the engine 100, power is applied by closing the switch 60 to heat the ignition plug 48. Pilot fuel is injected through the injector 54 and port 56 into the precombustion chamber 152. As the piston 118 approaches the top dead center position, ignition occurs in the pilot fuel in the precombustion chamber. The precombustion chamber 152 is isolated from the main cylinder or main combustion chamber 58 until the protuberance 126 leaves the head 114. When this occurs, main fuel injected through the injector 57 and port 59 is ignited by the burning pilot fuel in the precombustion chamber causing maximum piston thrust due to the burning of the main fuel charge.

Both engines 10 and 100, operating with the precombustion chamber arrangement described provide a means for burning difficult fuels and, yet, providing maximum or optimum efficiency for engine operation through complete combustion. Also, such complete combustion reduces the wear on the engine due to the elimination of unburned particles which would otherwise be present in the cylinders.

It will, of course, be understood that the embodiments described in detail hereinabove can be changed or modified without departing form the spirit or scope of the invention.

What is claimed is:

1. In an improved internal combustion engine of the diesel type, including a cylinder block having a cylinder bore therein, a head connected to the block covering one end of the bore, exhaust and air intake ports connected with the bore, a piston located in the cylinder bore and movable toward and away from the head, starter means for reciprocating the piston, and fuel supply means for injecting fuel into the cylinder bore, the improvement comprising:

an ignition plug member connected to said head;

a precombustion chamber defined by the piston and said plug member, said precombustion chamber connected to the fuel supply means for injection of fuel thereinto; and a main combustion chamber in the cylinder bore defined by the piston, head and block, said main combustion chamber connected to said precombustion chamber when said piston is remote from said plug member and isolated therefrom when said piston is located proximate the head.

2. In the engine of claim 1 wherein:

said piston has a cavity formed in the end thereof adjacent to said plug member; and said plug member is sized to project into and closely fit into said cavity when said piston is proximate said head.

3. In the engine of claim 2 wherein:

said cavity includes a generally hemispherical surface; and said plug member has a partially spherical recess in a surface thereon facing the hemispherical surface of said cavity providing a generally spherical precombustion chamber when said piston is proximate said head.

4. In the engine of claim 1 wherein:

said head has a cavity therein;

said plug member is located in said cavity; and said piston has a protuberance thereon sized to fit into said cavity.

5. In the engine of claim 4 wherein:

said plug member has a partially spherical recess therein; and said protuberance has a partially spherical cavity facing said plug member providing a generally spherical precombustion chamber when said protuberance is located in said cavity.

6. In the engine of claim 1 and also including means for heating said plug member.

7. In the engine of claim 2 and also including means for heating said plug member.

8. In the engine of claim 5 and also including means for heating said plug member.

9. In the engine of claim 6 wherein said plug member has at least one fuel passageway extending therethrough for the injection of fuel into said precombustion chamber.

10. In the engine of claim 7 wherein said plug member has at least one fuel passageway extending therethrough for the injection of fuel into said precombustion chamber.

11. In the engine of claim 8 wherein said plug member has at least one fuel passageway extending therethrough for the injection of fuel into said precombustion chamber.

* * * * *